Sept. 30, 1952  R. SYMINGTON ET AL  2,612,262
APPARATUS FOR EFFECTING MAGNETICALLY A SEPARATION BETWEEN
MAGNETISABLE AND NONMAGNETISABLE PARTICLES CONTAINED
IN LIQUIDS, SLURRIES, AND THE LIKE.
Filed March 27, 1951  2 SHEETS—SHEET 2

Inventors
Robert Symington
Laurence H. Cleat,
By
Attorney

Patented Sept. 30, 1952

2,612,262

UNITED STATES PATENT OFFICE 2,612,262

APPARATUS FOR EFFECTING MAGNETICALLY A SEPARATION BETWEEN MAGNETIZABLE AND NONMAGNETIZABLE PARTICLES CONTAINED IN LIQUIDS, SLURRIES, AND THE LIKE

Robert Symington and Laurence Hutcheson Cleat, Cheadle Heath, Stockport, England, assignors to Simon-Carves, Limited, Stockport, England, a British company Application March 27, 1951, Serial No. 217,718
In Great Britain April 4, 1950

5 Claims. (Cl. 209—5)

This invention relates to apparatus for effecting magnetically a separation between magnetisable and non-magnetisable particles contained in liquids, slurries and the like.

The apparatus forming the subject of this invention is particularly suitable for, but is not confined to the separation and recovery of magnetisable particles from slimes and sands contained in spray water and the like, in coal preparation and ore dressing processes working on the float-and-sink principle, where comminuted magnetisable material is used as a suspending medium.

In the sink-and-float process, a proportion of the suspending medium together with slimes, sands and the like adhere to the products of separation leaving the separating bath, and in order to minimise the loss of suspending medium it is customary to spray the products of separation with water and to recover the suspending medium from the spray water.

Where the suspending medium consists of finely divided magnetisable particles, recovery thereof can be effected magnetically by bringing the spray water or slurry containing the slimes, sands and magnetisable particles, into the magnetic field of a magnet arranged over a settling tank, so that the magnetisable particles are magnetised and consequently agglomerate, the larger masses formed by agglomeration, settling rapidly in the settling tank by reason of their increased weight as compared with that of non-agglomerated particles.

In practice it is found that in order fully to magnetise the magnetisable particles so as to obtain maximum agglomeration and the highest rate of settling, it is necessary to arrange the pole-piece of the magnet close to the surface of the water in the settling tank, with the result that the magnetisable particles are drawn magnetically on to the pole face of the magnet.

The magnetic action of the magnet is thus seriously reduced, and where a multiple pole magnet is used, is practically nullified, since the pole-pieces of the magnet are short-circuited by the particles adhering to and bridging the pole-pieces, so providing a direct magnetic path for the magnetic flux.

The magnetisable particles contained in the slurry or water which thereafter flows to the settling tank, therefore become only partially magnetised or are not magnetised at all, and efficient agglomeration and settling of the particles does not therefore take place.

The capacity of this known magnetic separator is thus materially reduced.

The principal object of the present invention is to provide a magnetic separating device the capacity of which is made relatively high by concentrating the field of influence of the magnet into a small area and enabling the local field strength to be concentrated without risk of attracted magnetic particles short-circuiting or bridging the pole faces of the magnet, thereby ensuring that all the magnetic particles are rapidly magnetised to the fullest extent and thereafter, as a result of agglomeration, settle at the maximum possible rate.

In the magnetic separating apparatus according to the present invention, a settling tank to which the liquid or slurry to be subjected to the separating process is fed, is provided at the top with a magnet which is adapted to produce a highly concentrated localised magnetic field in the close vicinity of, or even below the level attained by the liquid or slurry entering the tank, and a travelling collector of non-magnetic material is arranged to travel under the pole faces of the magnet, through the magnetic field, so that magnetisable particles contained in the liquid or slurry and drawn magnetically into the magnetic field, are intercepted by the collector which is adapted to carry them in their consequent magnetised and agglomerated condition out of the magnetic field and into a position in the liquid in the settling tank where they are free to leave the collector and settle in the settling tank.

The settling tank has a bottom outlet for settled magnetised and agglomerated particles, and an outlet at the top for liquid containing non-magnetisable particles, the upper outlet being preferably formed by arranging the upper rim of the tank as a weir at a level slightly lower than or corresponding approximately with the desired liquid level in the tank adjacent to the magnet which together with the collector and the liquid inlet are preferably surrounded by a wall or partition of non-magnetic material having its lower edge submerged in the liquid, so that the liquid containing the non-magnetisable particles is compelled to pass under that edge before escaping over the rim or weir of the tank.

The slurry is preferably fed into the tank by a pipe having a conical or like diverging nozzle arranged close to the underside of the collector below the magnet. An inlet pipe for clean water may be provided near the bottom of the tank to inject a slow upward stream of clean water in order to guard against settlement of large particles of non-magnetic slimes and sands.

An example of magnetic separating and densifying apparatus according to the invention is illustrated by the accompanying drawings wherein—

Figure 1:
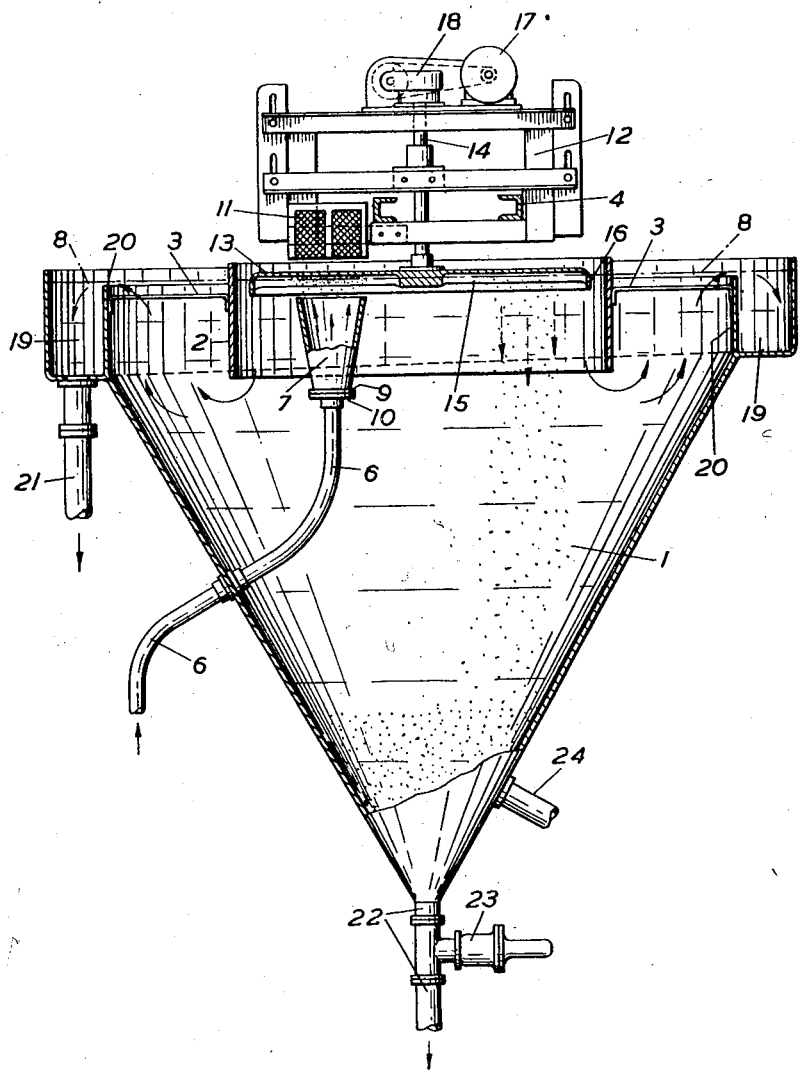
Figure 1 is a front sectional elevation of the apparatus on I—I Figure 2.
Figure 2:
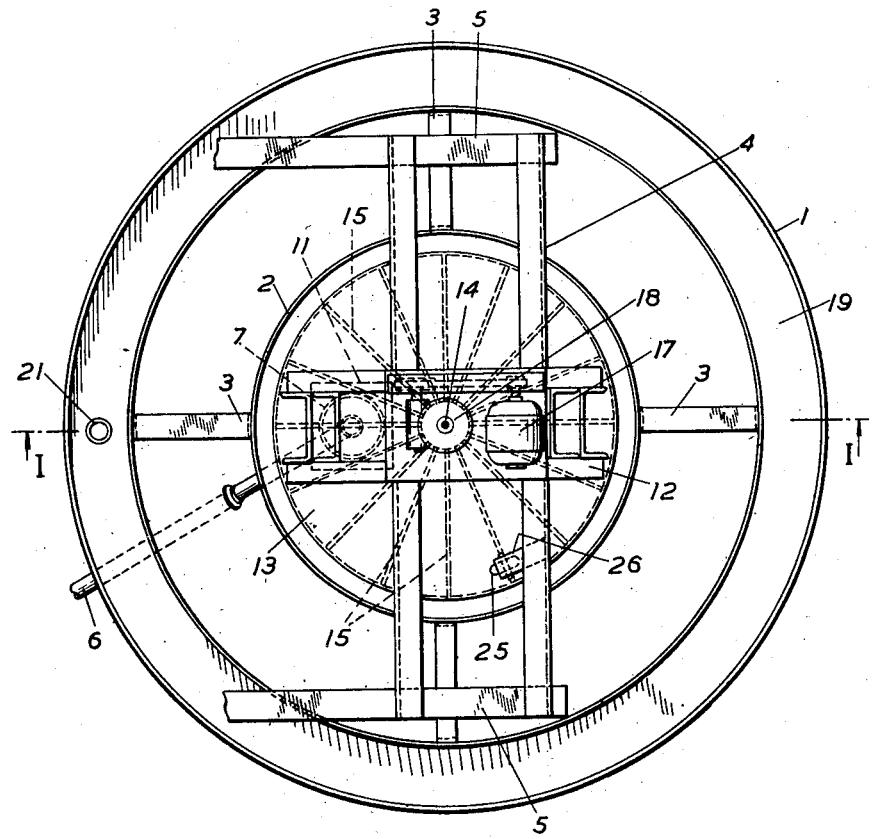
Figure 2 is a plan.
Figure 3:
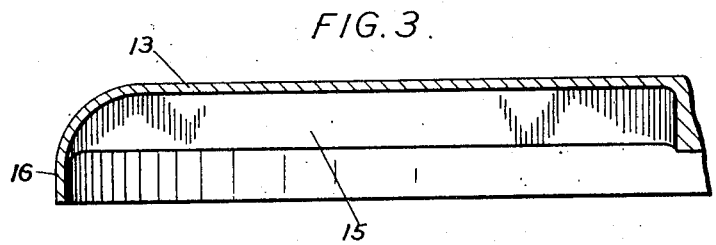
Figure 3 is a sectional elevation of part of the intercepting disc or collector on a larger scale.

In the example illustrated by these drawings a settling tank or vessel 1 in the form of a hollow cone is provided.

A non-magnetic annular wall 2, which may be cylindrical or conical is supported centrally in the top open end of the cone, by brackets 3 carried by the wall of the cone 1. The depth of the central annular wall 2 is such that its lower end is submerged in the liquid or slurry.

The slurry, consisting of finely-divided magnetisable and non-magnetisable particles in suspension in a liquid such as water is fed to the cone 1 by means of a feed pipe 6, which enters the wall of the cone about mid-way thereof and is extended upwards within the cone.

The upper end of the feed pipe is provided with a conical, pyramidal or like divergent nozzle 7, which is adjustable in an up and down direction on the upper end of the feed pipe 6, so that the wider end of the nozzle 7, which forms the outlet can be set slightly below the level attained by the liquid which has entered the cone and is indicated by the broken line 8, 8. The nozzle 7 may be adjusted on the pipe 6, for example, by packing the connecting flanges 9, 10 or the flange 10 may be screwed on the end of the pipe.

The nozzle 7 is made of non-magnetic material and is arranged eccentrically within the central annular wall 2.

An electromagnet 11 is supported directly above the surface of the liquid contained in the cone 1 and directly above the nozzle 7 of the feed pipe 6.

The electromagnet 11 is advantageously multipolar so that a highly concentrated local magnetic field is created between the pole faces, in the close vicinity of or below the level 8—8 of the liquid contained in the cone, directly above the nozzle 7 of the feed pipe 6.

The magnetic field created by the magnet 11 is made of such strength that in the absence of intercepting means, magnetisable particles would be withdrawn from the slurry by magnetic action, on to the pole faces of the magnet.

Intercepting means are, however, provided, in the form of a spinner disc 13, arranged between the pole faces of the magnet 11 and the top of the nozzle 7 at the top of the feed pipe 6.

The spinner disc 13 is arranged horizontally and is mounted on a spindle 14 to rotate slowly about a vertical axis, concentric with the annular wall 2.

It is made of non-magnetic metal such as that known as "Inconel."

It is provided on its underside with a series of radial vanes 15, and with a circumferential rim or wall 16.

The spinner disc 13 is rotated slowly by suitable means with the rim 16 just below the level of the liquid in the cone, the upper surface of the disc being just above the level of the liquid.

Convenient means for rotating the disc comprises an electric motor 17 driving the spindle 14 through reduction gearing 18.

A castor roller 25 carried by a bracket 26 fixed to a beam 4 bears on the upper surface of the disc.

The beam 4 forms part of the general supporting framework 5 of the apparatus, only a portion being shown.

The beam 4 supports a sub-frame 12 on which the electric motor 17, gearing 18 and spindle 14 are mounted.

The cone 1 is surrounded by a launder 19 to receive the liquid and non-magnetisable particles escaping over the top edge or weir 20 the height of which determines the liquid level 8—8.

The launder 19 has a discharge pipe 21.

The bottom of the cone 1 is provided with a discharge pipe 22 which may be fitted with a valve 23 preferably one capable of remote control such as a known type of pneumatically operated valve.

In operation, the slurry fed into the cone 1 through the feed pipe 6 and nozzle 7 comes under the influence of the highly concentrated and localised magnetic field of the magnet 11.

The magnetisable particles contained in the liquid are immediately drawn magnetically into the field and on to the spinner disc 13 which acts as a collector, such particles becoming fully magnetised, and by mutual magnetic attraction, therefore agglomerated. The nonmagnetisable particles are entirely unaffected.

The magnetised particles now held magnetically on the underside of the spinner disc 13 by the magnetic action of the field, are trapped between the radial vanes 15 of the disc, which prevent such particles slipping on the disc and remaining under the pole faces of the magnet 11 as the disc rotates.

As the spinner disc 13 slowly rotates the agglomerated magnetised particles are carried by the disc out of the magnetic field, and accordingly drop rapidly from the disc and sink to the bottom of the cone 1.

The magnetised agglomerated particles sink rapidly in the liquid contained in the cone 1, and are subjected to the densifying action of the cone, thereby concentrating themselves in the bottom of the cone whence they can be drawn off as a magnetic concentrate through the pipe 22 as required.

The non-magnetisable particles which have a much lower settling rate flow with the water under the central annular wall 2 and over the top edge or weir 20 of the cone 1 into the launder 19 from which they can be discharged through the discharge pipe 21 as slime-laden water free from magnetisable particles.

The central annular wall 2 serves to divide the surface of the liquid in the cone 1 into two areas.

Within the annular wall 2 considerable turbulence may occur; whereas in the annulus surrounding the central wall, the liquid will be relatively quiescent.

The central annular wall 2 is made of non-magnetic material, and it will be appreciated that the feed pipe 6, the magnet 11, and the spinner disc 13, are located within the central annular wall 2.

A slow upward stream of clean water may be injected into the cone 1 at or near the bottom thereof for instance by a pipe 24 in order to guard against the settlement of large particles of non-magnetic slimes and sands, thereby effecting a sharper separation between the non-magnetic material which is to flow over the top edge or weir 20 of the cone 1, from the magnetised agglomerates which are to be discharged from the bottom of the cone through the pipe 22.

The liquid or slurry fed by the pipe 6 to the cone 1 may be spray water from a coal washing or ore dressing plant operating on the sink-and-float principle, utilising finely divided magnetisable material as the suspending medium.

It will be understood that the inlet pipe 6 may be provided with means for regulating the rate of flow of the slurry fed by it to the cone so as to guard against undue turbulence in the vicinity of the magnetic field and collector at the top of the cone, and also undue rate of flow under the annular wall 2, so as to allow the collector to operate efficiently and to ensure settlement in the tank 1 of the separated magnetic particles discharged from the collector.

The rate of flow will naturally vary according to the nature of the particles to be separated.

Similarly the clean water inlet pipe 24 when used may be provided with means for regulating the rate of flow of injected water.

We claim:

1. An apparatus for effecting magnetically a separation between magnetisable and non-magnetisable particles contained in liquid, slurry or the like comprising a settling tank, means for feeding liquid, slurry or the like to said tank, a magnet at the top of the tank for producing a highly concentrated localised magnetic field in the vicinity of the level of liquid in the tank, a collector disc of non-magnetic material mounted adjacent to the magnet and means for rotating said collector disc under the pole faces of the magnet for the purpose of intercepting magnetic particles contained in the liquid and attracted into the magnetic field and for carrying said collected particles into a position in the liquid out of said magnetic field for release and settlement in the tank, said means for feeding slurry into the tank comprising a pipe having a divergent outlet nozzle situated close to the underside of said collector disc and below said magnet for the purpose of feeding the slurry immediately into the magnetic field produced by said magnet.

2. An apparatus for effecting magnetically a separation between magnetisable and non-magnetisable particles contained in liquid, slurry or the like as specified in claim 1 wherein said collector disc is provided with radial vanes on its underside and a circumferential rim having its lower edge immersed in the liquid in the tank.

3. An apparatus for effecting magnetically a separation between magnetisable and non-magnetisable particles contained in liquid, slurry or the like comprising a settling tank having an outlet for the discharge of densified magnetisable particles at the bottom of said tank, and an overflow outlet at the top of said tank for the discharge of liquid containing non-magnetisable particles, means for feeding slurry into said tank, a partition at the top of the tank partly submerged in the liquid in the tank and enclosing an area of said liquid, a magnet mounted at the top of the tank for producing a highly concentrated localised magnetic field in the vicinity of the level of the liquid in the enclosed area and a collector disc of non-magnetic material mounted adjacent to the magnet and means for rotating said collector disc below the pole faces of said magnet for the purpose of intercepting magnetic particles contained in the liquid and attracted into the magnetic field, and for carrying them to a position in the area of liquid enclosed by said partition which is outside the magnetic field for release and settlement in the tank, said means for feeding slurry into the tank comprising a feed pipe provided with a divergent delivery nozzle situated close to the underside of said collector disc and below said magnet for the purpose of delivering the slurry immediately into the magnetic field produced by said magnet.

4. An apparatus for effecting magnetically a separation between magnetisable and non-magnetisable particles contained in liquid, slurry or the like, comprising a conical settling tank having an overflow weir at its top for discharge of liquid containing non-magnetisable particles, an outlet at its bottom for densified magnetisable particles, an annular partition partly submerged in the liquid at the top of the tank and in spaced relation to said overflow weir, a feed pipe provided with a divergent nozzle extending into the liquid enclosed by said partition, a magnet mounted at the top of said tank close above said nozzle for producing a highly concentrated localised magnetic field in the vicinity of the level of the liquid which has entered the tank from said nozzle, a collector disc of non-magnetic material mounted adjacent to said magnet and means for rotating said collector disc below the pole faces of said magnet for the purpose of intercepting magnetisable particles in the liquid attracted into the magnetic field and for carrying them into a position out of said field but within the area of liquid enclosed by said partition for release and settlement in the tank.

5. An apparatus for effecting magnetically a separation between magnetisable and non-magnetisable particles contained in liquid, slurry or the like, as specified in claim 4 wherein the settling tank is provided with an inlet pipe near its bottom for injecting clean water for the purpose of assisting the separation of non-magnetisable particles which are to flow over the weir from the magnetised agglomerates which are to be discharged from the bottom of the tank.

ROBERT SYMINGTON.
LAURENCE HUTCHESON CLEAT.

REFERENCES CITED

The following references are of record in the file of this patent:

UNITED STATES PATENTS

| Number | Name | Date |
|---|---|---|
| 509,728 | Gillespie | Nov. 28, 1893 |
| 812,171 | Grondal | Feb. 6, 1906 |
| 1,310,802 | Manegold | July 22, 1919 |
| 1,366,979 | Ullrich | Feb. 1, 1921 |
| 1,392,414 | Gow | Oct. 4, 1921 |
| 2,003,430 | Crockett | June 4, 1935 |

FOREIGN PATENTS

| Number | Country | Date |
|---|---|---|
| 18,134 | Sweden | May 1, 1903 |

OTHER REFERENCES

"Simon-Carves Dense-Medium Washer," Colliery Engineering, December 1951, pages 501 to 506.